(12) United States Patent
Osmanis et al.

(10) Patent No.: US 10,955,685 B2
(45) Date of Patent: Mar. 23, 2021

(54) VOLUMETRIC DISPLAY ARRANGEMENT AND A METHOD FOR REPRESENTING CONTENT OF AN IMAGE

(71) Applicant: Lightspace Technologies, SIA, Marupes novads (LV)

(72) Inventors: Ilmārs Osmanis, Mārupes novads (LV); Robers Zabels, Riga (LV); Uģis Gertners, Riga (LV); Mārtiņš Narels, Riga (LV); Krišs Osmanis, Babītes novads (LV); Rendijs Smukulis, Riga (LV); Armands Šmaukstelis, Rēzeknes novads (LV)

(73) Assignee: Lightspace Technologies, SIA, Marupe (LV)

( * ) Notice: Subject to any disclaimer, the term of this patent is extended or adjusted under 35 U.S.C. 154(b) by 165 days.

(21) Appl. No.: 16/235,491

(22) Filed: Dec. 28, 2018

(65) Prior Publication Data
US 2020/0209638 A1    Jul. 2, 2020

(51) Int. Cl.
*G02B 30/52*     (2020.01)
*G02B 27/01*     (2006.01)

(52) U.S. Cl.
CPC ......... *G02B 30/52* (2020.01); *G02B 27/0101* (2013.01); *G02B 2027/0127* (2013.01); *G02B 2027/0138* (2013.01)

(58) Field of Classification Search
CPC . B82Y 20/00; G02F 1/157; G02F 1/01; G02F 1/155; G02F 2203/10; G02B 30/52;
(Continued)

(56) References Cited

U.S. PATENT DOCUMENTS

| 4,999,011 A | 3/1991 | Suzuki et al. |
| 2017/0154464 A1 | 6/2017 | Lanier et al. |

(Continued)

FOREIGN PATENT DOCUMENTS

| WO | 2017061019 A1 | 4/2017 |
| WO | 2018180857 A1 | 10/2018 |

OTHER PUBLICATIONS

Notification of Transmittal of The International Search Report and The Written Opinion of The International Searching Authority, or The Declaration. Application No. PCT/EP2019/084565, dated Apr. 24, 2020.15 Pages.

*Primary Examiner* — Mohammed A Hasan
(74) *Attorney, Agent, or Firm* — Ziegler IP Law Group, LLC

(57) ABSTRACT

Disclosed is volumetric display arrangement for representing content of an image at different focal distances in a view of real-world environment. The volumetric display arrangement includes at least one image projection unit operable to project multiple depth planes of the image, at least one electro-optical unit comprising two or more optical diffuser elements arranged parallel to each other, the at least one electro-optical unit being positioned to receive the projected multiple depth planes of the image thereon and configured to independently display one of the projected multiple depth planes of the image at one of the two or more optical diffuser elements at a given instant of time, and an optical combiner positioned with respect to the at least one electro-optical unit to combine the view of real-world environment with the independently displayed multiple depth planes of the image in the at least one electro-optical unit.

15 Claims, 8 Drawing Sheets

(58) Field of Classification Search
CPC ........ G02B 27/0101; G02B 2027/0127; G02B 2027/0138; G02B 2027/0185; H04N 13/395
USPC ......................................................... 359/245
See application file for complete search history.

(56) References Cited

U.S. PATENT DOCUMENTS

2018/0095284 A1* 4/2018 Welch ................ G02B 27/0172
2019/0086661 A1* 3/2019 Misawa ................ B60K 35/00

* cited by examiner

VOLUMETRIC DISPLAY ARRANGEMENT AND A METHOD FOR REPRESENTING CONTENT OF AN IMAGE

TECHNICAL FIELD

The present disclosure relates generally to display arrangements; and more specifically to volumetric display arrangements for representing an image in a view of real-world environment. Furthermore, the present disclosure also relates to methods for representing an image in a view of real-world environment.

BACKGROUND

With the advancements in technology, three-dimensional (3D) content visualization has gained popularity in the recent years as information, data, objects, models and so forth visualized in three-dimensional (3D) format are effectively perceived and retained by the human brain. Therefore, three-dimensional imagery is used in the fields of education (for example, to show three-dimensional models to students at schools and colleges), civil engineering, air traffic control management (for example, to model airspace surrounding an airport), architecture, medicine, research and science, military and defence (for example, to depict topographical models of battlefields), and the like.

Several techniques have been developed to present three-dimensional (3D) imagery. Typically, two-dimensional displays such as Liquid Crystal Display (LCDs), diode-based displays and the like are employed to present graphical content such as images, videos and so forth in a three-dimensional (3D) format. However, such techniques of representing three-dimensional images on two-dimensional displays fail to present physical depth cues which are essential for a realistic representation of three-dimensional images and thus limiting the perception and spatial awareness of viewers viewing content on such displays. Furthermore, to realistically represent three-dimensional objects and scenes, modern three-dimensional display technologies such as stereoscopic displays, including head-mounted displays, helmet-mounted displays and the like are employed. However, such techniques are also associated with multiple problems. Currently, techniques employing stereoscopic displays utilize conventional 2D imaging solutions allowing presenting only psychological depth cues and limited physical depth cues to imitate depth and thus cannot correctly drive accommodation and convergence. Thus, these depth-sensing mechanisms, which naturally are linked, become decoupled, which can cause unpleasant sensations to the viewer and thus limit the viewing time, and can also cause human errors based on inadequate decision making due to incorrectly or imprecisely perceived 3D information.

Therefore, in the light of the foregoing discussion, there exists a need to overcome the aforementioned drawbacks associated with conventional techniques employed for presenting three-dimensional imagery including representation of not just psychological depth cues but also correct physical depth cues.

SUMMARY

The present disclosure seeks to provide a volumetric display arrangement for representing a three-dimensional image in a view of a real-world environment. The present disclosure also seeks to provide a method for representing a three-dimensional image, via the volumetric display arrangement in a view of a real-world environment. The present disclosure seeks to provide a solution to the existing problems such as improper scalability, low resolution and representation of three-dimensional images within conventional display apparatuses for three-dimensional imaging. An aim of the present disclosure is to provide a solution that overcomes at least partially the problems encountered in prior art, and offers a robust, user-friendly volumetric display arrangement capable of enhanced representation of three-dimensional graphical information in terms of brightness, contrast, resolution and so forth.

In one aspect, an embodiment of the present disclosure provides a volumetric display arrangement for representing content of an image at different focal distances in a view of real-world environment for eyes of a viewer, the volumetric display arrangement comprising:

at least one image projection unit operable to project multiple depth planes of the image;

at least one electro-optical unit comprising two or more optical diffuser elements arranged parallel to each other, the at least one electro-optical unit being positioned to receive the projected multiple depth planes of the image thereon and configured to independently display one of the projected multiple depth planes of the image at one of the two or more optical diffuser elements at a given instant of time; and an optical combiner positioned with respect to the at least one electro-optical unit to combine the view of real-world environment with the independently displayed multiple depth planes of the image in the at least one electro-optical unit.

In another aspect, an embodiment of the present disclosure provides a method for representing content of an image at different focal distances in a view of real-world environment for eyes of a viewer using at least one electro-optical unit comprising two or more optical diffuser elements arranged parallel to each other, the method comprising:

projecting multiple depth planes of the image;

displaying, independently, one of the projected multiple depth planes of the image at one of the two or more optical diffuser elements at a given instant of time; and combining the view of real-world environment with the independently displayed multiple depth planes of the image.

Embodiments of the present disclosure substantially eliminate or at least partially address the aforementioned problems in the prior art, and enable truthful depiction of the three-dimensional image via the volumetric display arrangement. Further, the represented three-dimensional images have an enhanced psychological depth cues and physical depth cues to correctly imitate depth associated with an image being viewed by the viewer. Additionally, the experience of the viewer is further enhanced by combining the view of real-world environment to the image being viewed.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
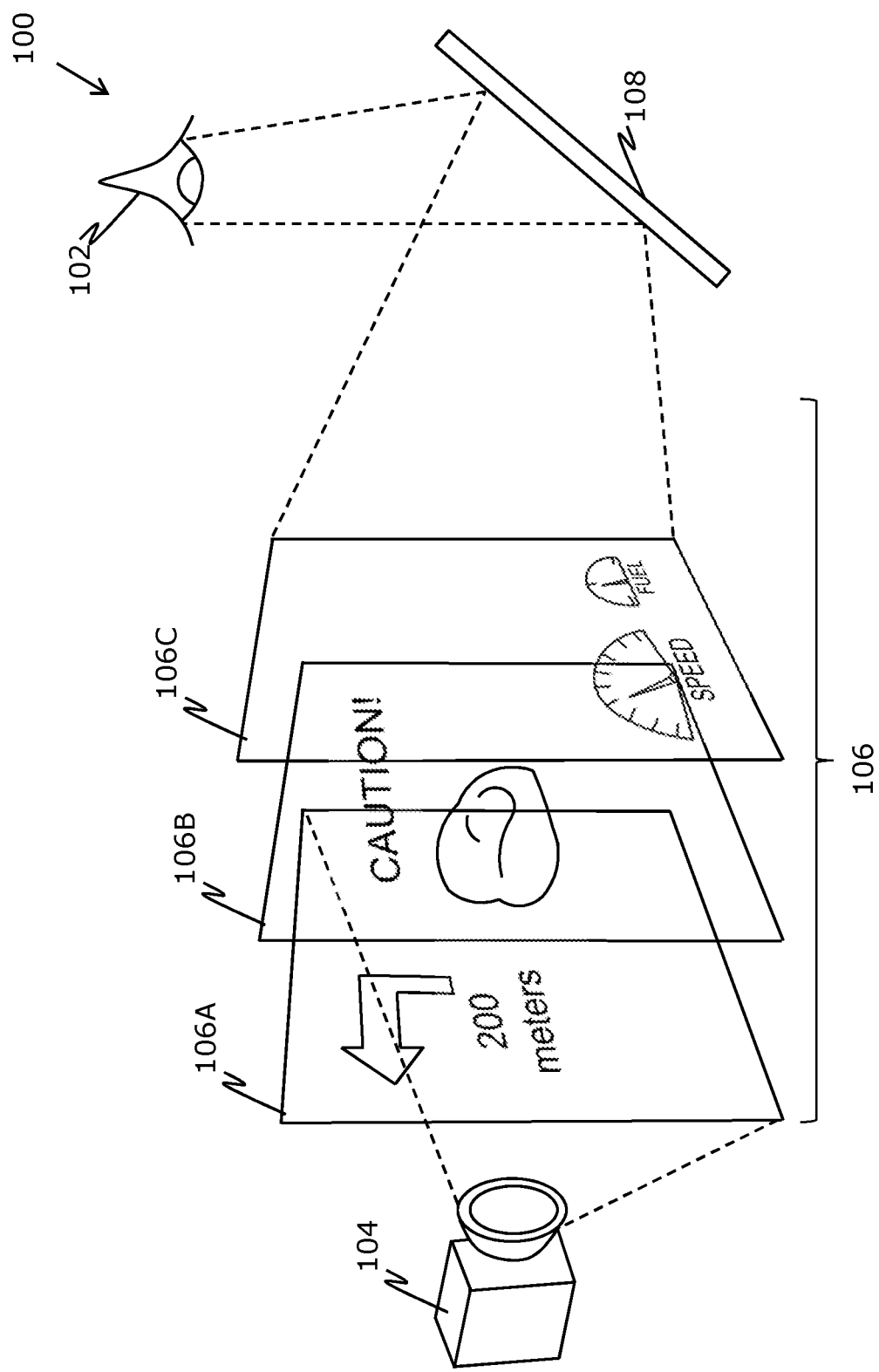
FIG. 1 is an illustration of a schematic representation of a volumetric display arrangement for representing content of an image at different focal distances in a view of real-world environment for viewer, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a volumetric display arrangement for representing content of an image at different focal distances in a view of real-world environment for eyes of a viewer, the volumetric display arrangement comprising:

at least one image projection unit operable to project multiple depth planes of the image;

at least one electro-optical unit comprising two or more optical diffuser elements arranged parallel to each other, the at least one electro-optical unit being positioned to receive the projected multiple depth planes of the image thereon and configured to independently display one of the projected multiple depth planes of the image at one of the two or more optical diffuser elements at a given instant of time; and an optical combiner positioned with respect to the at least one electro-optical unit to combine the view of real-world environment with the independently displayed multiple depth planes of the image in the at least one electro-optical unit.

In another aspect, an embodiment of the present disclosure provides a method for representing content of an image at different focal distances in a view of real-world environment for eyes of a viewer using at least one electro-optical unit comprising two or more optical diffuser elements arranged parallel to each other, the method comprising:

projecting multiple depth planes of the image;

displaying, independently, one of the projected multiple depth planes of the image at one of the two or more optical diffuser elements at a given instant of time; and combining the view of real-world environment with the independently displayed multiple depth planes of the image.

Throughout the present disclosure, the term "volumetric display arrangement" used herein relates to specialized equipment for presenting the three-dimensional (3D) image to a viewer in a manner that the three-dimensional image truthfully appears to have actual physical depth. In other words, the volumetric display arrangement is operable to act as a device for visually presenting the three-dimensional image in a three-dimensional space. The volumetric display arrangement comprises at least one image projection unit operable to project multiple depth planes of the image. The volumetric display arrangement also comprises at least one electro-optical unit comprising two or more optical diffuser elements arranged parallel to each other. The configuration and details about the various components of the volumetric display arrangement are described in the subsequent paragraphs.

Throughout the present disclosure, the term "image projection unit" used herein relates to specialized equipment for projecting the plurality of image slices (portions) of the three-dimensional image upon the plurality of optical diffuser elements of the volumetric display arrangement. Optionally, the image projection unit comprises a light source, a spatial light modulator, a processor and projection optics. More optionally, the image projection unit relates to an arrangement of optical components (for example, such as lenses, mirrors, prisms, apertures, and the like) that are configured to direct a modulated light beam towards the optical diffuser elements. Notably, the image projection unit allows for sharply focusing the plurality of image slices upon the plurality of optical diffuser elements. The image projection unit provides a sufficient depth of field which encompasses a projection volume. As a result, sufficiently sharp images are displayed on the plurality of optical diffuser elements. Furthermore, the image projection unit may include an aperture to adjust at least a depth of field and a brightness of the plurality of image slices.

Optionally, the image projection unit is implemented by way of active optical components which are electrically controllable to actively focus the plurality of image slices upon their corresponding optical diffuser elements. Examples of such active optical components include, but are not limited to, liquid crystal-based electroactive lenses and electrostatically controllable membranes.

Optionally, a refresh rate of the image projection unit is based upon a volumetric refresh rate of the volumetric display arrangement and the number of the plurality of optical diffuser elements. The refresh rate of the image projection unit can be understood to be a rate at which the plurality of image slices are projected by the projector of the image projection unit. Throughout the present disclosure, the term "volumetric refresh rate" relates to a rate at which a given plurality of image slices pertaining to a single three-dimensional image are displayed, in some cases repeatedly, on the plurality of optical diffuser elements of the volumetric display arrangement.

Furthermore, the term "three-dimensional image" relates to a volumetric image (namely, an image having a height, a width, and a depth in the three-dimensional space). A given three-dimensional (3D) image could be a given volumetric image of at least one three-dimensional object (for example, such as a statue, a vehicle, a weapon, a musical instrument, an abstract design, and the like), a three-dimensional scene (for example, such as a beach scene, a mountainous environment, an indoor environment, and the like), and so forth. Moreover, the term "three-dimensional image" also encompasses three-dimensional computer-generated surfaces. Furthermore, the term "three-dimensional image" also encompasses a three-dimensional point cloud.

Throughout the present disclosure, the term "image slice" relates to a portion (namely, a slice or a fragment) of the three-dimensional image. The three-dimensional image can be deconstructed (or decomposed) into multiple image slices corresponding to multiple depths within the three-dimensional image, by way of image processing algorithms. Herein, the three-dimensional image is a combination of the plurality of image slices. It will be appreciated that when a given volumetric display arrangement is implemented by way of multiple optical diffuser elements, different parts of the image slice are displayed on different optical diffuser elements.

The volumetric display arrangement of the present disclosure is implemented for representing content of the image at different focal distances in the view of real-world environment for eyes of the viewer. As discussed, the image projection unit, in the volumetric display arrangement, is operable to project multiple depth planes of the image. Optionally, the image projection unit is communicatively coupled to a processor configured to segregate a three-dimensional image fed thereto into the plurality of image slices. Notably, the processor may be a personal computer with dedicated graphics processing unit or a specialized hardware, software and/or a firmware combination. The processor can be understood to be a unit that performs processing tasks for the volumetric display arrangement. A plurality of computational tasks are conveyed for execution on the graphics processing unit by utilizing application programming interfaces (APIs), possibly in various combinations, for example, such as NVIDIA®, CUDA®, OpenCL®, DirectX®, OpenGL®, etc. The image projection unit is configured to project the processed content of the image, i.e. the multiple depth planes of the image. Optionally, the image projection unit may be implemented as a plurality of communicatively coupled units, such that, for example, one of the communicatively coupled unit is responsible for receiving an image data from an image source, whereas another one is responsible for the direct control of the image projection unit and another one coordinates synchronous operation of image projection unit and the electro-optical unit. The content of the image is represented at different focal distances with respect to the viewer, such as the viewer perceives a depth corresponding to the multiple depth planes of the image.

Furthermore, the at least one electro-optical unit, in the volumetric display arrangement, comprises two or more optical diffuser elements arranged parallel to each other, such that the at least one electro-optical unit is positioned to receive the projected multiple depth planes of the image thereon and configured to independently display one of the projected multiple depth planes of the image at one of the two or more optical diffuser elements at a given instant of time. In the present electro-optical unit, the two or more optical diffuser elements may be adhered together to form a single unit, or may be arranged in stack with gaps (such as an air gap) in between. At least two optical diffuser elements are required in the electro-optical unit to provide a depth associated with the 3D image. The two or more optical diffuser elements independently display the projected multiple depth planes of the image at the given instant of time. Herein, the given instant of time is dependent on the refresh rate of the image projection unit.

Optionally, a thickness of the two or more optical diffuser elements lies within a range of 0.3 millimetres to 2 millimetres; and specifically about 1.1 millimetres. In an example, the thickness of the at least one optical diffuser may be from 0.3, 0.4, 0.5, 0.6, 0.7, 0.8, 0.9, 1.0, 1.1, 1.2 or 1.3 mm up to 0.5, 0.6, 0.7, 0.8, 0.9, 1.0, 1.2, 1.3, 1.4, 1.5, 1.6, 1.7, 1.8, 1.9 or 2 mm.

Further, optionally, a number of the plurality of optical diffuser elements within the volumetric display arrangement lies within a range of 2 to 50. As an example, the volumetric display arrangement may comprise from 2, 3, 4, 5, 6, 7, 8, 9, 10, 11, 12, 13, 14, 15, 16, 17, 18, 19, 20, 21, 22, 23, 24, 25, 30, 35 or 40 up to, 6, 7, 8, 9, 10, 11, 12, 13, 14, 15, 16, 17, 18, 19, 20, 21, 22, 23, 24, 25, 30, 35, 40, 45 or 50 optical diffuser elements. Alternatively, optionally, the number of the plurality of optical diffuser elements within the volumetric display arrangement is greater than 50. As an example, the volumetric display arrangement may comprise 55, 60, 65, 70, 75, 80, 85, 90, 95 or 100 optical diffuser elements.

Optionally, the three-dimensional image is processed to generate a predefined number of image slices (referred to as the multiple depth planes of the image throughout the disclosure) corresponding thereto. In an embodiment, the predefined number of image slices that are to be generated upon processing of the three-dimensional image is equal to the number of the optical diffuser elements within the volumetric display arrangement. In such a case, when the electro-optical unit in use, and one image slice is to be projected per optical diffuser element. In another embodiment, the predefined number of the plurality of image slices generated upon processing of the three-dimensional image is lesser than the number of the plurality of optical diffuser elements within the volumetric display arrangement. In such a case, there would exist at least one unused optical diffuser element, after all the image slices are projected upon the plurality of other optical diffuser elements. As an example, the number of optical diffuser elements in the volumetric display arrangement may be equal to 10. In such a case, the three-dimensional image may be processed to generate 2, 3, 4, 5, 6, 7, 8, 9 or 10 image slices.

Furthermore, optionally, the processor is configured to perform at least one image processing operation whilst processing the three-dimensional image to generate the plurality of image slices. The at least one image processing operation could relate to pre-processing operations as well as post-processing operations. Examples of the at least one image processing operation include, but are not limited to, linear transformation (for example, such as translation, rotation and the like) of the three-dimensional image, cropping of the three-dimensional image, addition and/or removal of graphical information and/or pointer information to the plurality of image slices, colour adjustment of the three-dimensional image, contrast adjustment of the three-dimensional image, inter-slice antialiasing for the three-dimensional image.

In an embodiment, each of the two or more optical diffuser elements is operable to be switched between an optically transparent state and an optically light diffusing state. Optionally, a given optical diffuser element has at least two operational states, the at least two operational states comprising at least the optically transparent state and the optically light diffusing state. When the given optical diffuser element is in the optically transparent state, light within the visible spectrum of electromagnetic radiation substantially passes therethrough, and the image slice is not displayed at the given display element. However, when the given optical diffuser element is in the optically light diffusing state, a majority of light incident upon the given optical diffuser element is forward scattered and the image slice is displayed at the given optical diffuser element. Notably, only one of the at least two optical diffuser element will be in the optically light diffusing state at a given point of time, whereas the remaining optical diffuser element will be in the optically transparent state.

In an embodiment, the at least one electro-optical unit comprises a transitional medium layer arranged between each of the two or more optical diffuser elements thereof, wherein the transitional medium layer has a refractive index equivalent to a refractive index of one or more of substrates of the optical diffuser elements in contact therewith. The transitional medium layer is provided between each of the two or more optical diffuser elements, wherein the transitional medium layer is typically a thin layer. The refractive index of the transitional medium layer is equivalent to, or an average or median of, the refractive indexes of the substrates of each of the two or more optical diffuser elements in contact therewith, in order to avoid any distortions in the incident light that are likely to occur at the boundaries of the transitional medium layer and the corresponding optical diffuser element. Therefore, in the present electro-optical unit, the optical diffuser elements provide uninhibited transmission of light between each other without much reflections at the boundaries between the corresponding optical diffuser elements due to index matching by the transitional medium layer.

Optionally, the transitional medium layer comprises one or more of an optically transparent viscous resin and an optically transparent adhesive to hold the adjacent optical diffuser elements together. In an example, the transitional medium layer may be implemented in the form of a lamination or a coating. In one or more examples, each of the two or more optical diffuser elements and the transitional medium layer therebetween are pressed together to expel any possible air bubbles from the transitional medium layer.

In an embodiment, the volumetric display arrangement further comprises a controller operatively coupled to the at least one image projection unit and the at least one electro-optical unit, and being operable to control the at least one image projection unit to project the depth planes of the image in a time-multiplexed manner substantially synchronously with the optical state changes of the two or more optical diffuser elements such that a respective depth plane of the image is projected when an intended optical diffuser element is in the optically light diffusing state. The term "controller" relates to specialized hardware, software, firmware, or a combination of these, that is configured to control the operational states of the plurality of optical diffuser elements of the volumetric display arrangement. Notably, the controller electrically controls the operational states of the plurality of display elements, based upon the plurality of image slices that are projected via the image projection unit. The controller electrically controls the operational states of the plurality of optical diffuser elements in a manner that, at any given time, only one optical diffuser element whereupon a given image slice is to be projected, is in the optically light diffusing state while remaining optical diffuser elements are in the optically transparent state. Furthermore, the controller utilizes a control signal for managing operation of the optical diffuser elements. Optionally, the controller controls each of the at least two optical diffuser elements to be in the optically light diffusing state, in a cyclic manner. In an embodiment, a progressive order of switching each of the at least two optical diffuser elements to the optically light diffusing state, is from a nearest optical diffuser element to a farthest optical diffuser element with respect to the viewer. In another embodiment, the progressive order of switching the optical diffuser elements to the optically light diffusing state is from the farthest optical diffuser element to the nearest optical diffuser element with respect to the viewer. In yet another embodiment, an interlaced order is employed for switching the optical diffuser elements to the optically light diffusing state. It will be appreciated that the controller controls the operational states of the optical diffuser elements substantially synchronously with the projection of the plurality of image slices upon the optical diffuser elements.

Optionally, the controller controls operation of the volumetric display arrangement according to a master-slave configuration. In such a case, the controller comprises a plurality of driver logic blocks for synchronizing operation of the image projection unit and the optical diffuser elements, the plurality of driver logic blocks being arranged hierarchically in a manner that one driver logic block functions as a 'master' whereas other driver logic block(s) functions as 'slave(s)'. The 'master' provides a synchronization signal to the 'slave(s)' for implementing such a synchronization operation.

In an example, the image projection unit may project three image slices IS1, IS2 and IS3 of a given three-dimensional image that are to be displayed upon three optical diffuser elements DE1, DE2 and DE3 respectively. In such a case, when the image slice IS1 is to be displayed upon the optical diffuser element DE1, the controller may be configured to switch the optical diffuser element DE1 to the optically light diffusing state while switching the remaining optical diffuser elements DE2 and DE3 to the optically transparent state. Similarly, when the image slice IS2 is to be displayed upon the optical diffuser element DE2, the controller may be configured to switch the optical diffuser element DE2 to the optically light diffusing state while switching the remaining optical diffuser elements DE1 and DE3 to the optically transparent state. Furthermore, when the image slice IS3 is to be displayed upon the optical diffuser element DE3, the controller may be configured to switch the optical diffuser element DE3 to the optically light diffusing state while switching the remaining optical diffuser elements DE1 and DE2 to the optically transparent state. The aforesaid switching pattern may be repeated cyclically for multiple times within a single second based on the required refresh rate.

In another example, the controller may be used for controlling the operation of the electro-optical unit. One of the main utilizations of such a controller is in selecting the number of the optical diffuser elements used for the display of the 3D image. In other words, the electro-optical unit may comprise eight optical diffuser elements, however only four of the eight optical diffuser elements are switched by the controller as required.

Alternatively, optionally, the controller may be substituted by a device employing a firmware and/or a software and so forth. For example, the device may be used to disable or enable the selected optical diffuser elements. That is, one of the optical diffuser elements may be kept in a permanently optically transparent state, while displaying the 3D image. In one example, some of the optical diffuser elements may be kept in a, generally, permanent optically transparent state and the 3D image is displayed by cycling the remaining optical diffuser elements between the optically light diffusing state and the optically transparent state, as required.

The given optical diffuser element can be understood to act as an electrically controllable screen (i.e. controlled by the controller), which passes light through itself whilst operating in the optically transparent state and makes such light visible to the viewer whilst operating in the optically light diffusing state. Therefore, in operation, optical diffuser elements are rapidly and sequentially switched between the at least two operational states to display the plurality of image slices. As a result, there is produced a visible effect of actual physical depth within the three-dimensional image.

Optionally, the volumetric refresh rate of the volumetric display arrangement lies within 20 Hz to 120 Hz. When the given plurality of image slices pertaining to the single three-dimensional image are displayed once at the optical diffuser elements, the volumetric display arrangement is said to have displayed one volume of the single three-dimensional image. Therefore, the volumetric refresh rate of the volumetric display arrangement relates to a number of volumes that the volumetric display arrangement can display in one second. It will be appreciated that a high volumetric refresh rate facilitates a flicker-less image viewing experience for the viewer. As an example, if a given volumetric refresh rate of the volumetric display arrangement is 30 Hz, the volumetric display arrangement can display 30 volumes of a given three-dimensional image in one second. Optionally, the volumetric refresh rate of the volumetric display arrangement ranges from 40 Hz to 100 Hz. More optionally, the volumetric refresh rate of the volumetric display arrangement is 50 Hz. The volumetric refresh rate of the volumetric display arrangement may thus range for example from 40, 45, 50, 55, 60, 65, 70, 75 or 80 Hz up to 50, 55, 60, 65, 70, 75, 80, 85, 90, 95 or 100 Hz.

In an embodiment, the volumetric display arrangement may be implemented as one of an augmented reality device, a mixed reality device, a heads-up display and a desktop display device. In particular, the volumetric display arrangement may be implemented for augmented reality experience or mixed reality experience in the form of a heads-up display or a desktop display. It will be appreciated that the electro-optical unit of the volumetric display arrangement may be implemented in a Virtual Reality (VR) display device, such as a stereoscopic VR headset or a head mounted display. A VR display primarily is intended for a 3D representation of a virtual data (such as a 3D image).

Furthermore, the volumetric display arrangement comprises the optical combiner positioned with respect to the at least one electro-optical unit to combine the view of real-world environment with the independently displayed multiple depth planes of the image in the at least one electro-optical unit. It will be appreciated that by incorporating the optical combiner, the volumetric display arrangement may be implemented in augmented reality (AR) display devices and mixed reality (MR) display devices, wherein the display devices may be head mounted displays, heads up displays, desktop displays and so forth. The AR display devices and the MR display devices are constructed to ensure optical fusion (amalgamation) of the real-world environment and the virtually or a digitally projected 3D image. Notably, the AR display devices and the MR display devices require a combination of the view of real-world environment with the independently displayed multiple depth planes of the images, therefore, the optical combiner is positioned with respect to the at least one electro-optical unit such that the viewer is able to view the combined view of the 3D image (as generated by the at least one electro-optical unit) and the real-world environment through the optical combiner. To achieve this, the multiple depth planes of the image in the at least one electro-optical unit are projected on the optical combiner.

In an embodiment, the volumetric display arrangement further comprises an imaging device configured to capture and project the view of real-world environment onto the optical combiner. The imaging device may include at least one of a depth camera, an image registering device, a digital single lens reflex (DSLR) camera, a mirror less camera, and further projection optics. The imaging device is communicatively coupled and in sync with the image projection unit. The imaging device captures the view of real-world environment and projects the view on the optical combiner, such that the viewer is able to view the multiple depth planes of the image as well as the view of real-world environment combined on the optical combiner. Such an amalgamation of the view of real-world environment and the multiple depth planes of the image enables the viewer to perceive the 3D image in the virtual reality, the augmented reality or the mixed reality (as configured). Optionally, the imaging device may be used for rendering an image such as for an amalgamation of a real-world and a virtual world, thereby recreating an altered or a mixed reality content. In another implementation, the image(s) from the imaging device is digitally combined with virtual image being projected on the optical diffuser elements, either by directly projecting the image from the imaging device to the optical diffuser elements or by digital processing at the controller, to perceive the combined 3D image in the virtual reality, the augmented reality or the mixed reality (as configured).

Optionally, at least one auxiliary device may be communicatively coupled to the image projection unit. The at least one auxiliary device includes, but is not limited to, a switch, a sensor, a combination of multiple sensors, a combination of multiple switches and so forth. Notably, the at least one auxiliary device is used to configure, alter or complement the operation of the volumetric display arrangement.

In an embodiment, the optical combiner is implemented as at least one of a partially-transparent mirror, a switchable glass, a prism, a waveguide, a holographic optical element, a lens and a diffraction grating. The optical combiner may be the partially-transparent mirror so that the viewer is able to observe the view of real-world environment (i.e. immediate surroundings) through the optical combiner, due to its transparent nature. Further, the optical combiner provides that a part of the projected 3D image, form the electro-optical unit, is reflected towards the viewer, due to its reflective nature. Thus, the optical combiner ensures optical fusion of the actual reality and the projected 3D image (i.e. the digitally processed or the virtual reality). Furthermore, the optical combiner may be the prism or a combination of prisms, the waveguide, the holographic optical element, the lens or a combination thereof, the diffraction grating and so forth.

Optionally, the optical combiner implemented as the waveguide includes an in-coupling element and an out-coupling element. The light associated with the multiple depth planes of the image is projected (or guided) by the waveguide through the in-coupling element, via total internal reflection phenomenon, and the light reaches the out-coupling element. Thereby, the viewer is able to observe the recreated 3D image via the out-coupling element.

Optionally, the waveguide may be a geometrical refractive type waveguide. In such a waveguide, the in-coupling element may be an optical element such as a prism. Moreover, the out-coupling element may be a series of angled semi-transparent (such as wavelength-sensitive) mirrors and so forth.

More optionally, the waveguide may be a holographic type waveguide. In such a waveguide, the in-coupling element may be diffraction grating specifically tailored for the waveguide. Moreover, the out-coupling element may be a diffractive (such as a holographic) grating.

In an embodiment, the volumetric display arrangement comprises a first electro-optical unit and a second electro-optical unit, wherein the at least one image projection unit is operable to project a first set of images and a second set of images corresponding to the image onto the first electro-optical unit and the second electro-optical unit respectively to provide a stereoscopic effect. The optical combiners implemented as the waveguides are generally employed in the AR display devices associated with a stereoscopic display. The stereoscopic display requires two sets of images, each set projected on the first electro-optical unit and a second electro-optical unit. Furthermore, the image projection unit is communicatively coupled to both the first electro-optical unit and a second electro-optical unit in order to project the first set of images and the second set of images on the respective electro-optical unit.

In an embodiment, the optical combiner has one of a planar shape, a curved shape and a free-form shape. The optical combiner may have the curved shape to provide an optical strength to the optical combiner. Optionally, the optical combiner may be a parabolic or spherical structure. Moreover, the optical combiner may be in any free-form shape, depending upon an application of the electro-optical unit.

In an embodiment, the volumetric display arrangement further comprises at least one optical member arranged between the at least one electro-optical unit and the optical combiner, wherein the at least one optical member guides projections of the independently displayed multiple depth planes of the image from the at least one electro-optical unit onto the optical combiner. The at least one optical member arranged between the at least one electro-optical unit and the optical combiner is configured to guide the projections of the multiple depth planes of the image formed on the two or more optical diffuser elements, such the guided projections are viewed by the viewer through the optical combiner.

In an embodiment, the at least one optical member is a single lens, or a combination of lenses, a Fresnel lens, a prism, a holographical optical element and a metamaterial optical element. Optionally, the at least one optical member may be arranged parallel to the electro-optical unit. The at least one optical member may be single optical lens configured to guide the projections towards the optical combiner. Moreover, the optical member may be combination of one or more optical lenses configured to guide the projections. Furthermore, the at least one optical member may be the Fresnel lens, the prism, the holographical optical element and the metamaterial optical element or a combination thereof. It will be appreciated that using of such optical members allow the 3D image projections to have an enhanced brightness and contrast, when projected from the electro-optical unit to the optical combiner.

In another embodiment, the at least one optical member is a magnifying optical element. Optionally, the at least one optical member may be placed at an angle with respect to the electro-optical unit. For example, the angle between the at least one optical member and the electro-optical unit may be in a range of 30 degrees to 60 degrees. Preferably, the angle between the at least one optical member and the electro-optical unit may be 45 degrees. The magnifying optical element is configured to project the recreated 3D image from the at least one optical member towards the optical combiner. Optionally, the magnifying optical element may be either a single optical element or multiple optical elements, wherein the multiple optical elements comprise at least one of the optical lens, a flat mirror, a curved mirror, an aspherical mirror, a freeform mirror and so forth.

In yet another embodiment, the at least one optical member is a semi-transparent beam splitter. In this embodiment, the optical member is preferably configured to guide the projections towards the optical combiner. Notably, the semi-transparent beam splitter splits the incident light in two directions. The semi-transparent beam splitter guides the projections towards the optical combiner. Optionally, the semi-transparent beam splitter is a substantially flat optical member. More optionally, the semi-transparent beam splitter is a 50/50 beam splitter, wherein the 50/50 beam splitter is configured to transmit 50% of the incident light and reflect 50% of the incident light. It will be appreciated that usage of such at least one optical member minimizes a distortion in the projected multiple depth planes of the image on the optical combiner, if any.

In an embodiment, the volumetric display arrangement further comprises an optical element arranged between the at least one image projection unit and the at least one electro-optical unit, wherein the optical element is operable to allow projection of each of the multiple depth planes of the image from the at least one image projection unit onto an intended optical diffuser element of the at least one electro-optical unit. Optionally, the optical element may be curved in shape. Such curved optical element ensures a focused light from the image projection unit onto the intended optical diffuser element. More optionally, the optical elements may be parabolic shaped, spherical shaped, free form shaped and so forth. Notably, the shape of the optical element is designed to work in conjunction with a projection lens of the projector of the image projection unit, thereby ensuring projection of a sharp image on the electro-optical unit. Yet more optionally, the optical element may be flat shaped mirrors, waveguides and so forth.

In an implementation, the electro-optical unit of the volumetric display arrangement is employed in drive assistance systems. Notably, some vehicles are equipped with the heads-up display (HUD) system, wherein the HUD system provides an information to an automobile driver without requiring to draw eyes away from the road on which the automobile is being driven. Moreover, a HUD system is also designed to overlay the multiple depth planes of the image on top of the view of real-world environment. By implementing the HUD system, the real-world environment with respect to the automobile may supplemented with a projection of a map, highlights of various objects requiring caution (such as pedestrians, other automobiles, animals and so forth), driving speed of the automobile and so forth for driver assistance. The existing HUD systems are based on representation of such graphical information in two dimensions (2D). In other words, the existing automobile HUD systems recreate a virtual screen (such as on the optical combiner) on which the relevant information is shown to the automobile driver. While for the most rudimentary information the 2D graphical information seems sufficient, but for an improved spatial awareness and versatility, true 3D HUD systems are desired.

The present volumetric display arrangement utilizing two or more optical diffuser elements allows a projection of virtual depth planes at multiple distances with respect to the automobile driver, thus adding a third dimension to the perceived imagery through the optical combiner. Notably, a number and a position of the virtual depth planes is determined by a design of the electro-optical unit. Optionally, the virtual depth planes may be in a range of 2 to 25. For example, the virtual depth planes may be in a range of from 2, 4, 6, 8, 10, 12, 14 or 16 up to 6, 8, 10, 12, 14, 16. 18, 20, 22, 24 or 25. It will be appreciated that by providing virtual depth planes, such as four virtual depth planes, results in improved spatial awareness of the automobile driver. In such an implementation, the multiple depth planes of the image are projected via the image projection unit. Furthermore, the optical member is operable to project the multiple depth planes onto the optical combiner. Optionally, the optical elements may be employed to accommodate the desired optical design within a front panel of the automobile. In an embodiment, a windshield of the automobile is implemented as the optical combiner that combines the view of the real-world environment with the multiple depth planes of the image.

Optionally, in order to provide an efficient attenuation of the projected processed image and the real-world environment, the windshield may be implemented as the semi-transparent mirror, wherein the transparency versus reflection is configured to follow a ratio 90%/10%, 85%/15%, 80%/20%, 75%/25%, 70%/30% and so forth. More optionally, a part (or a segment) of the windshield may be treated by a film-like material resulting in the semi-transparent mirror. Yet more optionally, the film-like material may be either electrically controllable to change the optical properties upon application/removal of a voltage or a current. Moreover, the film-like material may be an optical material sensitive to the intensity of the ambient light conditions (such as a type of passive photo-chrome material). Furthermore, a part of the projected light reflected from the optical combiner (i.e. the windshield) may be approximated as a tilted flat mirror. The reflected light reaches the automobile driver who observes the reflected light as perceived virtual depth planes.

In another implementation, the electro-optical unit of the volumetric display arrangement is employed in compact 3D display systems, such as a desktop display. Such a system is primarily intended for indoor use in educational, scientific, professional, leisure context and so forth. The image projection unit in the compact 3D display systems is equipped with a wide-angle lens ensuring large image throw ratio. Optionally, the image projection unit may be a digital micro mirror device, an LCoS (Liquid Crystal on Silicon) device, a transmissive LCD spatial light modulator, a solid-state micro-LED array and so forth. Notably, utilization of the wide-angle projection lens is of importance to ensure reduced size of the enclosure and thus, of the compact 3D display systems. The light from the image projection unit is projected towards the electro-optical unit. Alternatively, optionally, the optical path from the projection unit to the electro-optical unit may incorporate the optical element for focusing the light. Furthermore, the light from the electro-optical unit through the optical member is guided towards the optical combiner.

In an example, the optical combiner may be a highly reflective flat mirror which is fixed to a lid of the desktop display. Alternatively, the optical combiner may be a semi-transparent mirror. Utilization of the reflective flat mirror, as the optical combiner, can provide virtual reality experience; and that of the semi-transparent mirror, as the optical combiner, can provide an augmented or mixed reality experience to a viewer directly viewing the optical combiner. Optionally, the optical combiner can be a holographical optical combiner. More optionally, the optical combiner may be a curved mirror, such as a parabolic mirror. Yet more optionally, the optical combiner may be the free form shaped mirror.

It is to be understood that the light from the optical combiner reaches a viewer, who perceives the image as multiple virtual depth planes, wherein the multiple virtual depth planes contains spatially differentiated information, thereby causing a sensation of the depth of the image. In an alternate implementation of the compact 3D display systems, the optical elements are employed between the image projection unit and the electro-optical unit, in order to focus the light from the image projection unit to the electro-optical unit.

The present disclosure also relates to the method for representing content of an image at different focal distances in a view of real-world environment for eyes of a viewer using at least one electro-optical unit comprising two or more optical diffuser elements arranged parallel to each other. The method comprises projecting multiple depth planes of the image. The method further comprises displaying, independently, one of the projected multiple depth planes of the image at one of the two or more optical diffuser elements at a given instant of time. The method further comprises combining the view of real-world environment with the independently displayed multiple depth planes of the image. Various embodiments and variants disclosed above apply mutatis mutandis to the method.

DETAILED DESCRIPTION OF THE DRAWINGS

Referring to FIG. 1 illustrated is a schematic representation of a volumetric display arrangement 100 for representing content of an image at different focal distances in a view of real-world environment for viewer 102, in accordance with an embodiment of the present disclosure. As illustrated, the volumetric display arrangement 100 comprises at least one image projection unit 104, at least one electro-optical unit 106, and an optical combiner 108 operable to project multiple depth planes of the image. Further, the at least one electro-optical unit 106 comprises three optical diffuser elements 106A, 106B, and 106C arranged parallel to each other. The at least one electro-optical unit 106 is positioned to receive the projected multiple depth planes of the image thereon and configured to independently display one of the projected multiple depth planes of the image at one of the two or more optical diffuser elements (such as, 106A, 106B, and 106C) at a given instant of time. Further, the optical combiner 108 is positioned with respect to the at least one electro-optical unit 106 to combine the view of real-world environment with the independently displayed multiple depth planes of the image in the at least one electro-optical unit 106. In particular, the optical diffuser element 106A nearest to the viewer 102, displays information related to one or more dynamic status of a vehicle such as current speed, fuel meter and the like. Further, the optical diffuser element 106B, displays obstructions on the road such as a rock, other vehicles and so forth and generate a warning if safety instructions are violated. Further, the optical diffuser element 106C displays navigation information such as a left turn or a right turn depicted as an arrow on the optical diffuser element 106C.

Figure 2:
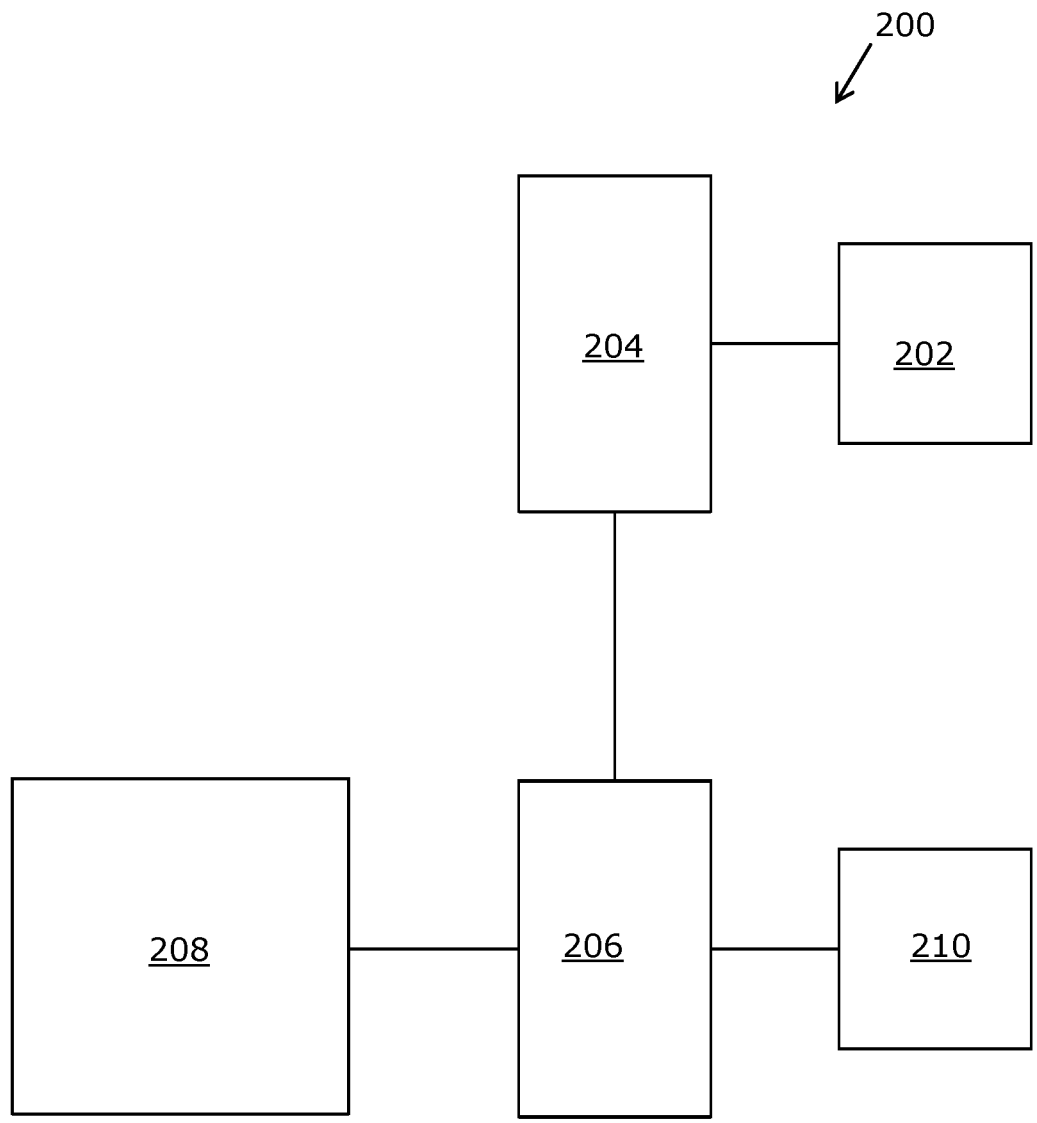
FIG. 2 is an illustration of a schematic representation of architecture of a volumetric display arrangement, in accordance with an embodiment of the present disclosure.
Figure 3A:
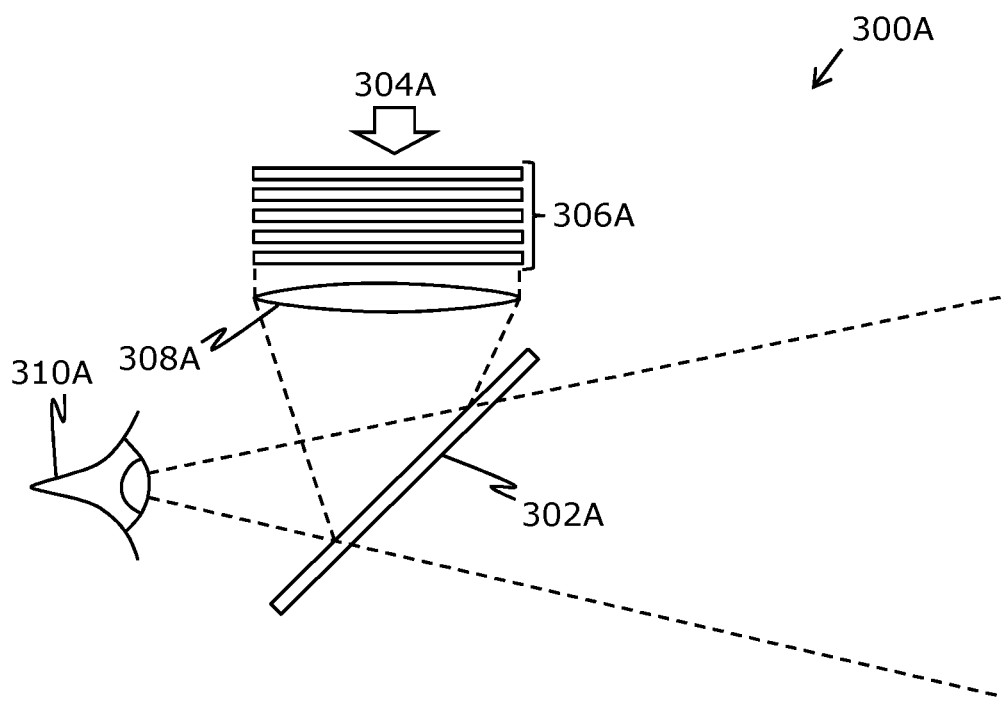
FIGS. 3A-3B and FIGS. 4-5 are illustrations of schematic representations of volumetric display arrangements implemented as a wearable display device, in accordance with various embodiments of the present disclosure.

Referring to FIG. 2, illustrated is a schematic representation of architecture of a volumetric display arrangement 200, in accordance with an embodiment of the present disclosure. As shown, an electro-optical unit 202 operable to project multiple depth planes of three-dimensional image, is communicatively coupled to the controller 204 which controls the operational state of the electro-optical unit 202. Further, an image projection unit 206 is communicatively coupled to the controller 204. The image projection unit 206 is communicatively coupled to the processor 208 configured to segregate the three-dimensional image fed thereto into the plurality of image slices. Further, the image projection unit 206 is communicatively coupled to an imaging device 210, wherein the imaging device 210 is configured to capture the view of real-world environment Referring to FIG. 3A, illustrated is a schematic representation of a volumetric display arrangement 300A to be implemented as a wearable display device, such as a headset, in accordance with an embodiment of the present disclosure. The volumetric display arrangement 300A comprises a planar optical combiner 302A. As shown, multiple depth planes of a three-dimensional image 304A are projected onto an electro-optical unit 306A. Further, the multiple depth planes of the three-dimensional image 304A are reproduced by the electro-optical unit 306A and the corresponding light emanating from the electro-optical unit 306A is guided through an optical member 308A arranged between the electro-optical unit 306A and the planar optical combiner 302A, to be projected towards the planar optical combiner 302A. The planar optical combiner 302A reflects a part of the multiple depth planes of the three-dimensional image 304A towards the viewer 310A. As shown, the viewer 310A looks through the planar optical combiner 302A to view the projected three-dimensional image on the planar optical combiner 302A combined with a view of the real-world environment from behind the optical combiner 302A. Notably, the planar optical combiner 302A may be semi-transparent in nature enabling the viewer 310A to observe immediate surroundings ensuring optical fusion of real-world environment and digitally processed three-dimensional image 304A, to provide an augmented or mixed reality experience to the viewer 310A.

Figure 3B:
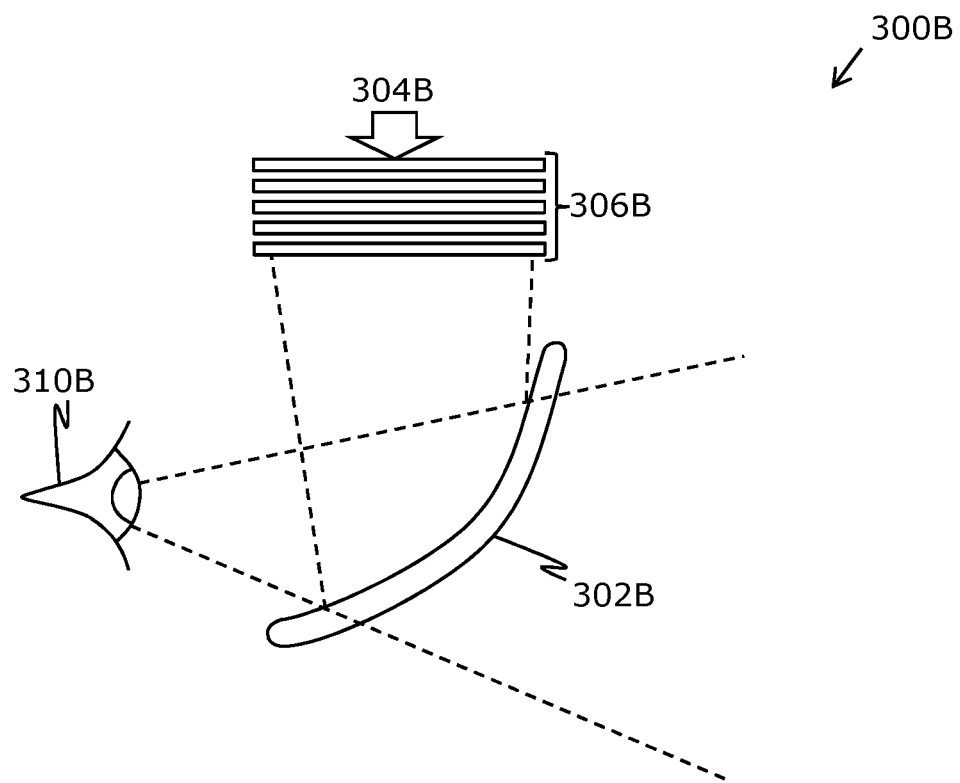

Referring to FIG. 3B illustrated is a schematic representation of a volumetric display arrangement 300B to be implemented as a wearable display device, such as a headset, in accordance with an embodiment of the present disclosure. The volumetric display arrangement 300B comprises a curved optical combiner 302B. As shown, multiple depth planes of a three-dimensional image 304B are projected onto an electro-optical unit 306B. Further, the multiple depth planes of the three-dimensional image 304B are reproduced by the electro-optical unit 306B and the corresponding light emanating from the electro-optical unit 306B is to be projected towards the curved optical combiner 302B. It may be appreciated that since the optical combiner 302B is curved, therefore the volumetric display arrangement 300B may not require a focusing lens or the like (such as the optical member 308A of FIG. 3A). The curved optical combiner 302B reflects a part of the multiple depth planes of the three-dimensional image 304B towards the viewer 310B. As shown, the viewer 310B looks through the curved optical combiner 302B. Notably, the curved optical combiner 302B is semi-transparent in nature enabling the viewer 310B to observe immediate surroundings ensuring optical fusion of real-world environment and multiple depth planes of the three-dimensional image 304B, to provide an augmented or mixed reality experience to the viewer 310B. Notably, the curved optical combiner 302B has an enhanced optical strength (as compared to the planar optical combiner 302A of the volumetric display arrangement 300A as shown in FIG. 3A), and is therefore capable of effectively reflecting the multiple depth planes of the three-dimensional image 304B towards the viewer 310B, to provide an augmented or mixed reality experience to the viewer 310B.

Figure 4:
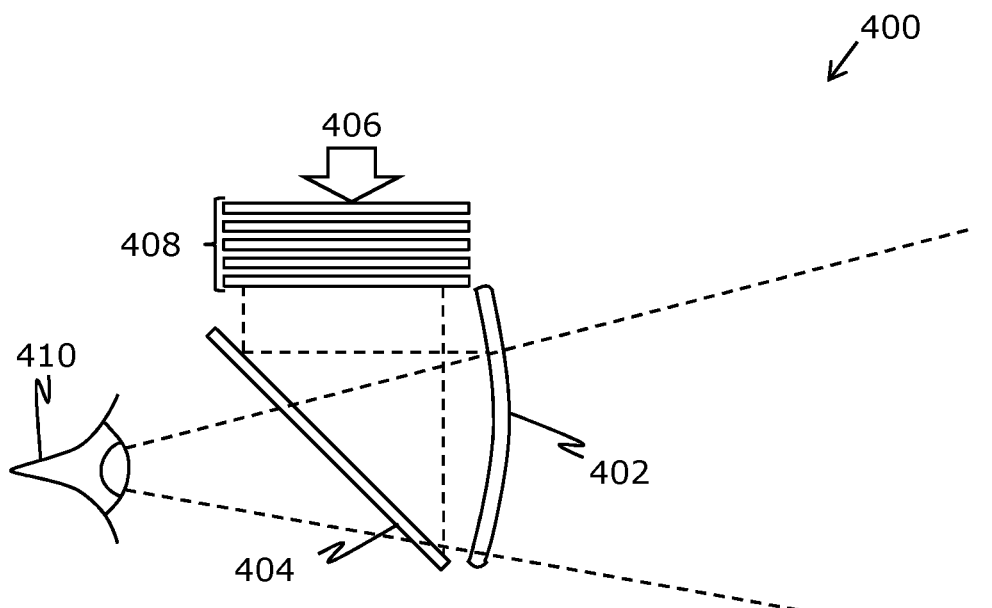

Referring to FIG. 4, illustrated is a schematic representation of a volumetric display arrangement 400 to be implemented as a wearable display device, such as a headset, in accordance with another embodiment of the present disclosure. The volumetric display arrangement 400 comprises a curved optical combiner 402 and an optical member 404. Herein, the optical member 404 is a semi-transparent mirror. As shown, the multiple depth planes of a three-dimensional image 406 are projected onto an electro-optical unit 408. Further, the multiple depth planes of the three-dimensional image 406 are reproduced by the electro-optical unit 408 and the corresponding light emanating from the electro-optical unit 408 is projected onto the optical member 404, arranged at an angle of 45 degrees with respect to the normal of the electro-optical unit 408. Further, the curved optical combiner 402 gathers the projected three-dimensional image reflected from the optical member 404 and reflects a part of the projected three-dimensional dimensional image focused towards the viewer 410 after combining the three-dimensional image with the real-world environment, ensuring minimal distortion of the real-world environment and the projected three-dimensional image, to provide a distortion-free augmented or mixed reality experience to the viewer 410.

Figure 5:
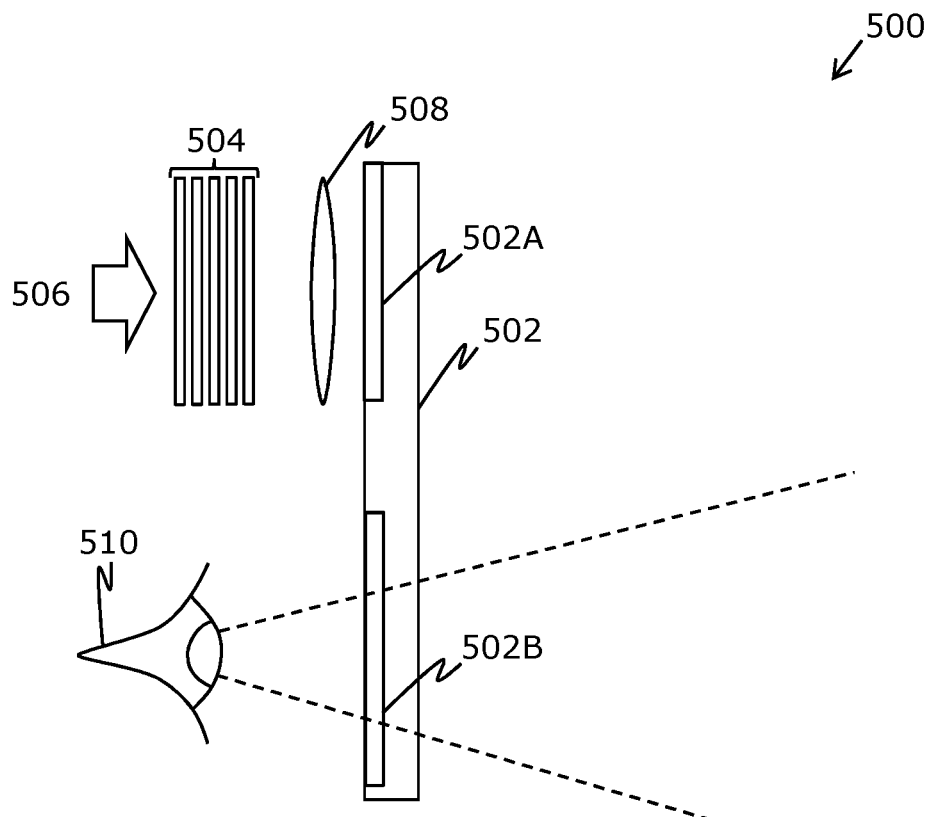

Referring to FIG. 5, illustrated is a schematic representation of a volumetric display arrangement 500 to be implemented as a wearable display device, such as a headset, in accordance with an embodiment of the present disclosure. The volumetric display arrangement 500 comprises an optical combiner which is implemented as a waveguide 502. As shown, the waveguide 502 includes an in-coupling element 502A and an out-coupling element 502B. Further, an electro-optical unit 504 is employed to receive multiple depth planes of three-dimensional image 506. Further, the multiple depth planes of the three-dimensional image 506 are reproduced by the electro-optical unit 504 and the corresponding light emanating from the electro-optical unit 504 is guided through an optical member 508 arranged between the electro-optical unit 504 and the waveguide 502. In particular, the light associated with the multiple depth planes of the three-dimensional image are projected (or guided) on the waveguide 502 by the in-coupling element 502A, via total internal reflection, and the light reaches the out-coupling element 502B. Thereby, a viewer 510, looking towards the waveguide 502, specifically at the out-coupling element 502B, is able to observe the recreated three-dimensional image via the out-coupling element 502B mixed with real-world environment behind thereof.

Figure 6A:
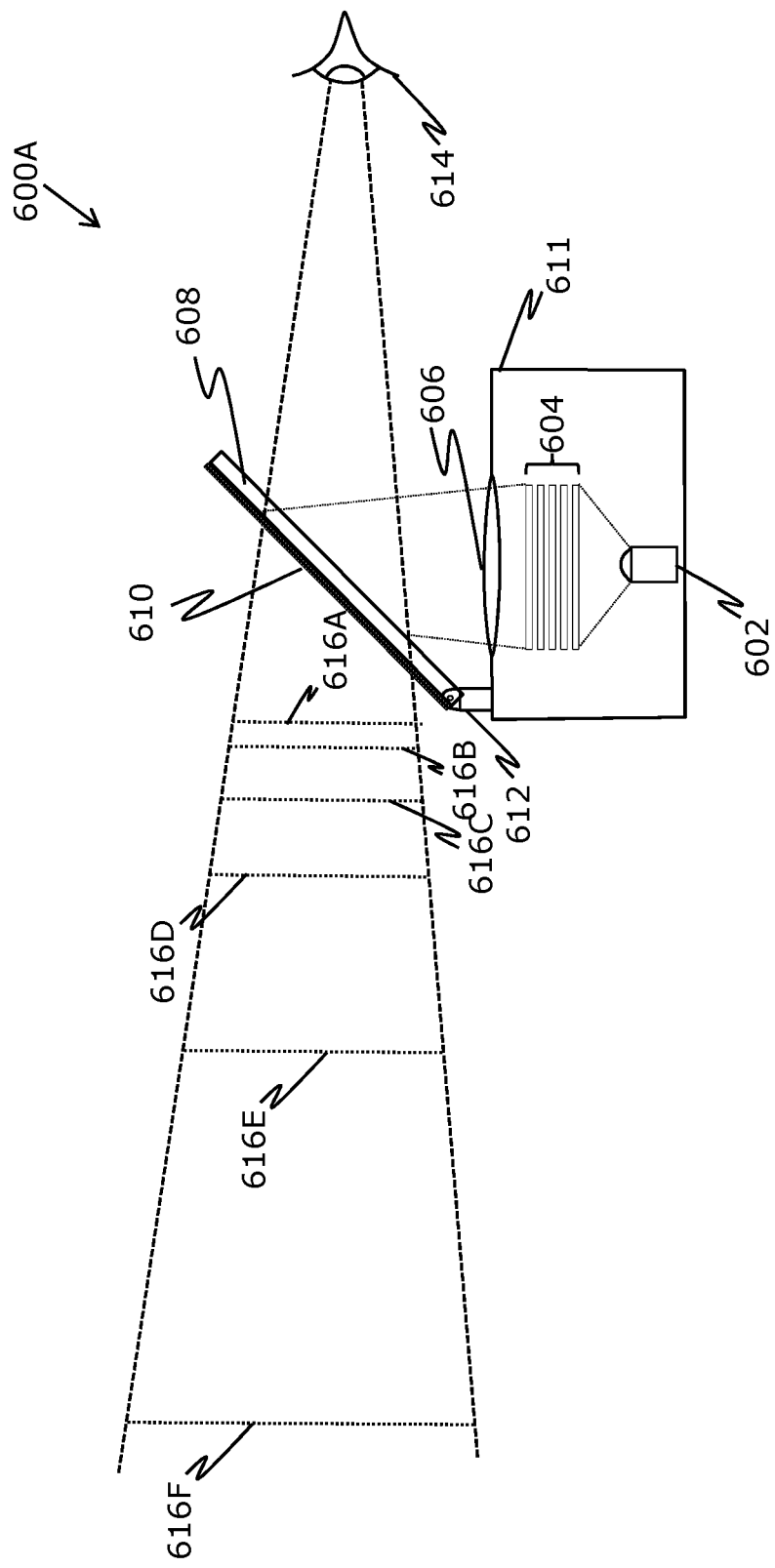
FIGS. 6A-6B are illustrations of schematic representations of volumetric display arrangements implemented as a desktop display, in accordance with different embodiments of the present disclosure.

Referring to FIG. 6A, illustrated is a schematic representation of a volumetric display arrangement 600A implemented as a desktop display (similar to a laptop device), in accordance with an embodiment of the present disclosure. As shown, an image projection unit 602 employed for projecting multiple depth planes of a three-dimensional image, is arranged beneath a lid 610 of the desktop display. Further, the multiple depth planes from the image projection unit 602 are directed towards the electro-optical unit 604, operable to receive the corresponding image depth planes from the image projection unit 602. Further, the multiple depth planes emanating from the electro-optical unit 604 are guided, through an optical member 606, towards an optical combiner 608. Notably, the optical combiner 608 is a flat mirror which is fixed to the lid 610 of an enclosure 611 of the desktop display, wherein one end of the lid 610 is pivotally coupled to the enclosure 611 of the desktop display, in the volumetric display arrangement 600A, via a hinge mechanism 612. In particular, the optical combiner 608 is a semi-transparent mirror providing mixing of the multiple depth planes of the image with real-world environment behind thereof, and thus providing augmented reality experience to a viewer 614. In some examples, the optical combiner 608 would serve as a lid by itself. Herein, the multiple depth planes from the optical combiner 608 reaches the viewer 614, which perceives the three-dimensional image as multiple virtual focus planes 616A, 616B, 616C, 616D, 616D, 616E, and 616F containing spatially differentiated information, with respect to the real-world environment, thus causing a sensation of depth.

Figure 6B:
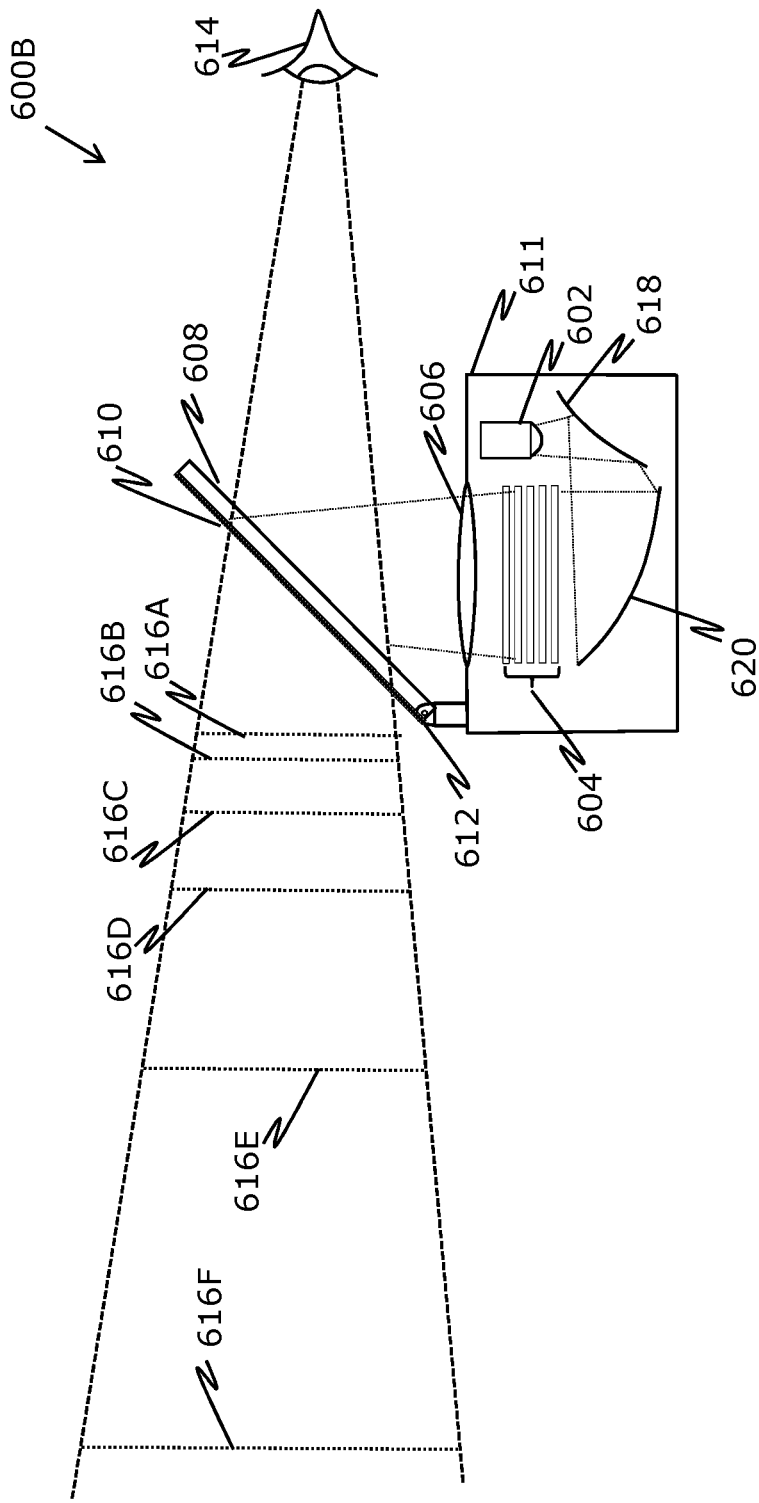

Referring to FIG. 6B, illustrated is a schematic representation of a volumetric display arrangement 600B implemented as a desktop display, in accordance with an embodiment of the present disclosure. As shown, an image projection unit 602 employed for projecting multiple depth planes of a three-dimensional image, arranged beneath a lid 610 of the desktop display. Further, the multiple depth planes from the image projection unit 602 are directed towards the electro-optical unit 604, operable to receive the corresponding image depth planes from the image projection unit 602. Herein, the multiple depth planes from the image projection unit 602 are directed towards the electro-optical unit 604 through the optical elements 618 and 620, wherein the optical elements 618 and 620 are arranged between the image projection unit 602 and the electro-optical unit 604 in order to minimize the optical path between the image projection unit 602 and the electro-optical unit 604, to make the present desktop display system compact in size. Further, the multiple depth planes emanating from the electro-optical unit 604 are guided, through an optical member 606, towards an optical combiner 608. Notably, the optical combiner 608 is a flat mirror which is fixed to the lid 610 of an enclosure 611 of the desktop display, wherein one end of the lid 610 is pivotally coupled to the enclosure 611 of the desktop display, in volumetric display arrangement 600, via a hinge mechanism 612. In particular, the optical combiner 608 is a semi-transparent mirror providing mixing of the multiple depth planes of the image with real-world environment behind thereof, and thus providing augmented reality experience to a viewer 614. In some examples, the optical combiner 608 would serve as a lid by itself. Herein, the multiple depth planes from the optical combiner 608 reaches the viewer 614, which perceives the three-dimensional image as multiple virtual focus planes 616A, 616B, 616C, 616D, 616D, 616E, and 616F containing spatially differentiated information, with respect to the real-world environment, thus causing a sensation of depth.

Figure 7:
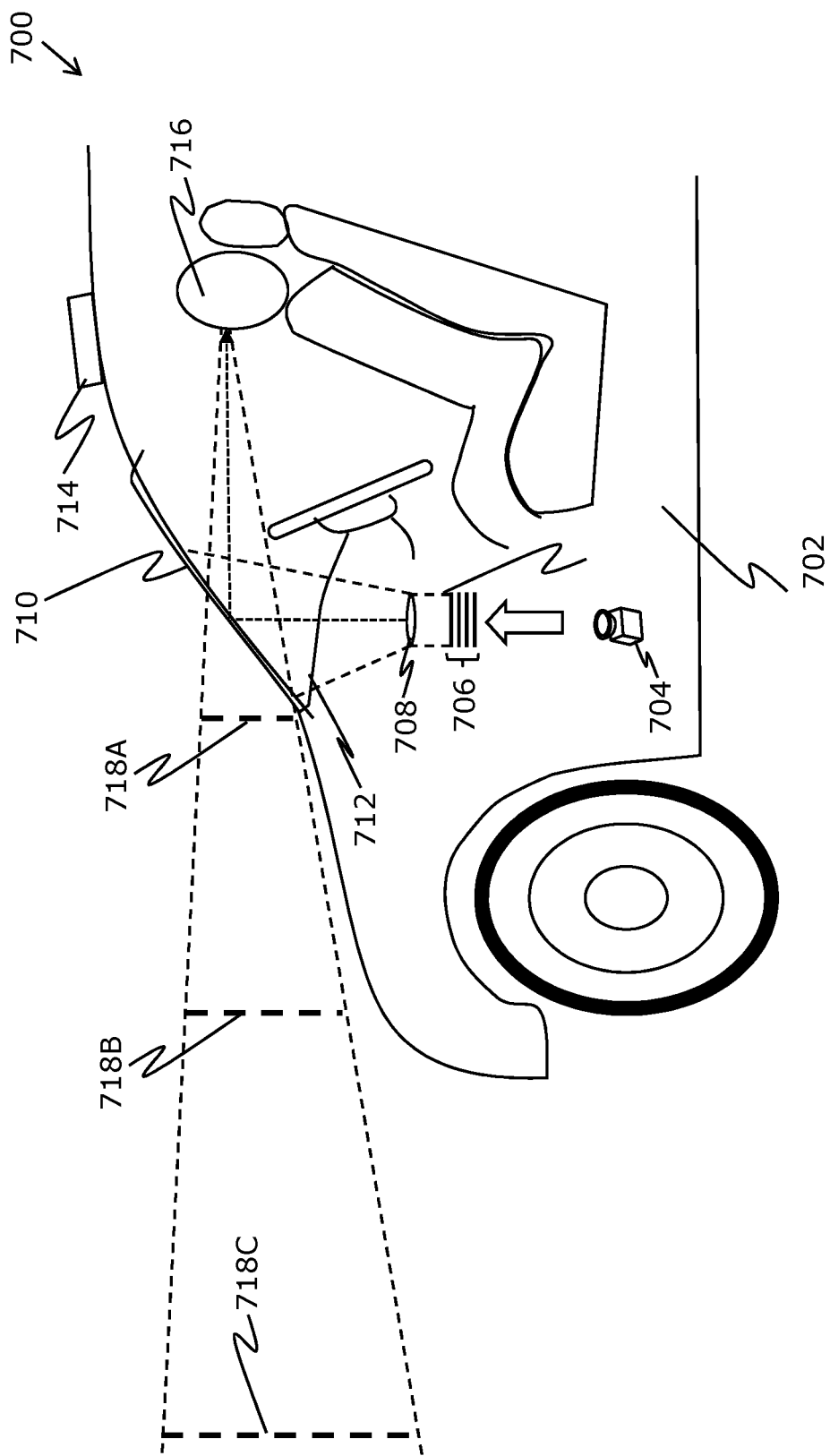
FIG. 7 is an illustration of a schematic representation of a volumetric display arrangement implemented as a heads-up display in a vehicle, in accordance with an embodiment of the present disclosure.

Referring to FIG. 7, illustrated is a schematic representation of a volumetric display arrangement 700 implemented as a heads-up display (or a driver assistance system) in a vehicle 702, in accordance with an embodiment of the present disclosure. As shown, an image projection unit 704 is employed for projecting multiple depth planes of a three-dimensional image. Further, the multiple depth planes from the image projection unit 704 are directed towards the electro-optical unit 706, arranged to receive the corresponding image depth planes from the image projection unit 704. Further, the multiple depth planes emanating from the electro-optical unit 706 are guided, through an optical member 708, towards a windshield 710 of the vehicle 702, wherein the windshield 710 serves as the optical combiner. Notably, the components, including the image projection unit 704, the electro-optical unit 706 and the optical member 708, are arranged beneath a front panel 712 of the vehicle 702, such that the multiple depth planes emanating from the electro-optical unit 706, and passing through the optical member 708 arranged in the front panel 712, are guided towards the windshield 710. The multiple depth planes from the windshield 710 are reflected therefrom to reach a viewer 716, which perceives the three-dimensional image as multiple virtual focus planes 718A, 718B, and 718C containing spatially differentiated information thus causing a sensation of depth. In the present implementation, the virtual focus plane 718A nearest to the viewer 716, displays information related to one or more dynamic status of the vehicle such as current speed, fuel meter and the like, the virtual focus plane 718B displays obstructions on the road such as a rock, other vehicles and so forth and generate a warning if safety instructions are violated, and the virtual focus plane 718C displays navigation information such as a left turn or a right turn depicted as an arrow on the virtual focus plane 718C; thus providing the viewer 716 with perception of the information being projection on the real-world environment of a road in front thereof providing a mixed reality experience. In some examples, the volumetric display arrangement 700 comprises an imaging device 714 employed for registering the real-world environment. Notably, the real-world three-dimensional images are exported to the image projection unit 704, wherein the three-dimensional real-world environment is combined with the multiple depth planes emanating from the electro-optical unit 706 to be projected on the windshield 710 providing an augmented reality experience, e.g. for learning driving in a simulator.

Figure 8:
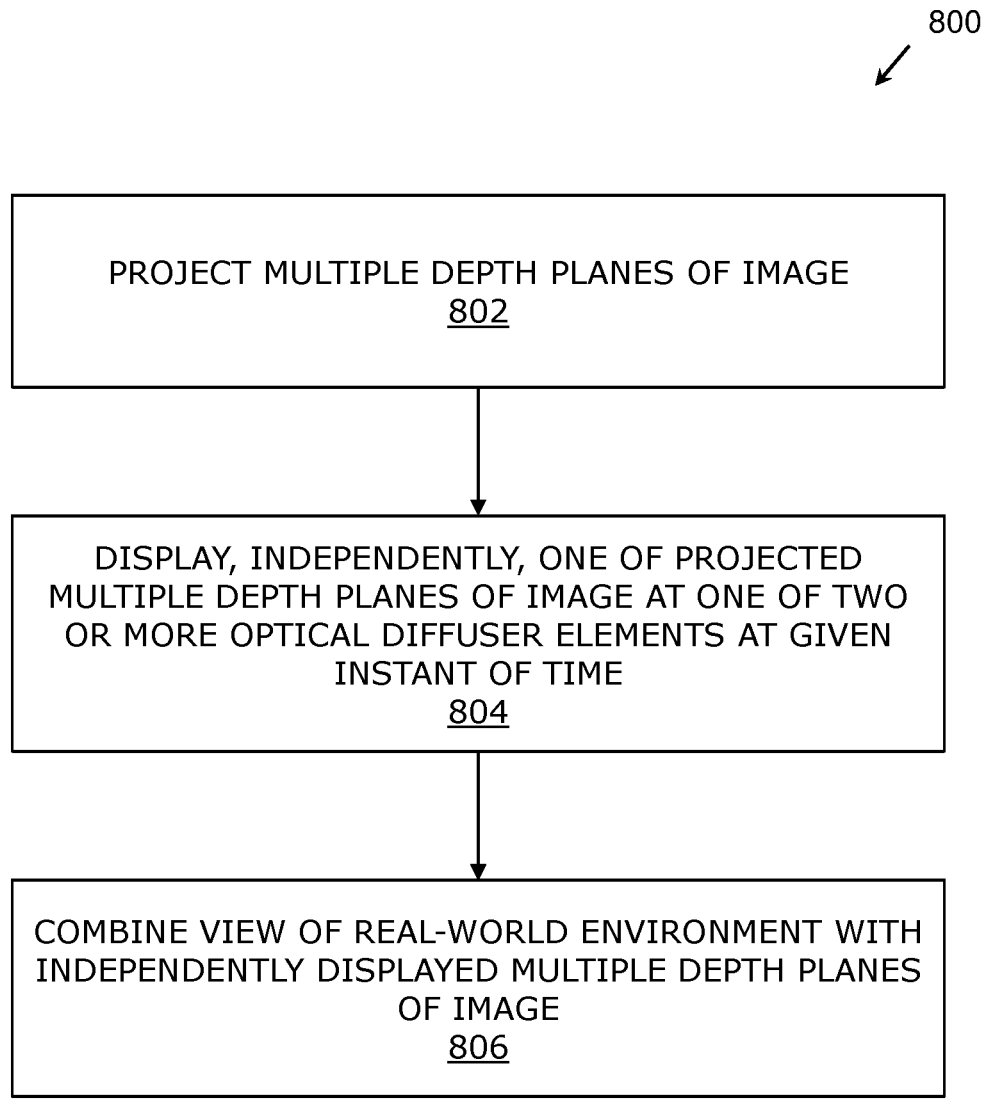
FIG. 8 is an illustration of steps of a method for representing content of an image at different focal distances in a view of real-world environment for eyes of a viewer, in accordance with an embodiment of the present disclosure.

Referring to FIG. 8, illustrated are steps of a method 800 for representing content of an image at different focal distances in a view of real-world environment for eyes of a viewer using at least one electro-optical unit comprising two or more optical diffuser elements arranged parallel to each other, in accordance with an embodiment of the present disclosure. At a step 802, multiple depth planes of the image are projected. At a step 804, one of the projected multiple depth planes of the image is displayed independently at one of the two or more optical diffuser elements at a given instant of time. At a step 806, the view of real-world environment is combined with the independently displayed multiple depth planes of the image.

Modifications to embodiments of the present disclosure described in the foregoing discussion are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A volumetric display arrangement for representing content of an image at different focal distances in a view of real-world environment for eyes of a viewer, the volumetric display arrangement comprising:

at least one image projection unit operable to project multiple depth planes of the image;

at least one electro-optical unit comprising two or more optical diffuser elements arranged parallel to each other, the at least one electro-optical unit being positioned to receive the projected multiple depth planes of the image thereon and configured to independently display one of the projected multiple depth planes of the image at one of the two or more optical diffuser elements at a given instant of time; and a waveguide with an in-coupling element positioned with respect to the at least one electro-optical unit to guide light associated with the multiple depth planes on the waveguide to combine the view of real-world environment with the independently displayed multiple depth planes of the image via total internal reflection to an out-coupling element.

2. A volumetric display arrangement according to claim 1, wherein each of the two or more optical diffuser elements is operable to be switched between an optically transparent state and an optically light diffusing state.

3. A volumetric display arrangement according to claim 2, further comprising a controller operatively coupled to the at least one image projection unit and the at least one electro-optical unit, and being operable to control the at least one image projection unit to project the depth planes of the image in a time-multiplexed manner substantially synchronously with the optical state changes of the two or more optical diffuser elements such that a respective depth plane of the image is projected when an intended optical diffuser element is in the optically light diffusing state.

4. A volumetric display arrangement according to claim 1, wherein the waveguide is implemented as at least one of a partially-transparent mirror, a switchable glass, a prism, a waveguide, a holographic optical element, a lens and a diffraction grating.

5. A volumetric display arrangement according to claim 1, wherein the waveguide has one of a planar shape, a curved shape and a free-form shape.

6. A volumetric display arrangement according to claim 1, further comprising at least one optical member arranged between the at least one electro-optical unit and the waveguide, wherein the at least one optical member guides projections of the independently displayed multiple depth planes of the image from the at least one electro-optical unit onto the waveguide.

7. A volumetric display arrangement according to claim 6, wherein the at least one optical member is a magnifying optical element.

8. A volumetric display arrangement according to claim 6, wherein the at least one optical member is a single lens, or a combination of lenses, a Fresnel lens, a prism, a holographical optical element and a metamaterial optical element.

9. A volumetric display arrangement according to claim 6, wherein the at least one optical member is a semi-transparent beam splitter.

10. A volumetric display arrangement according to claim 1, further comprising an optical element arranged between the at least one image projection unit and the at least one electro-optical unit, wherein the element is operable to allow projection of each of the multiple depth planes of the image from the at least one image projection unit onto an intended optical diffuser element of the at least one electro-optical unit.

11. A volumetric display arrangement according to claim 1, further comprising an imaging device configured to capture and project the view of real-world environment onto the waveguide.

12. A volumetric display arrangement according to claim 2, wherein the at least one electro-optical unit comprises a transitional medium layer arranged between each of the two or more optical diffuser elements thereof, wherein the transitional medium layer has a refractive index equivalent to a refractive index of one or more of substrates of the optical diffuser elements in contact therewith.

13. A volumetric display arrangement according to claim 1 comprising a first electro-optical unit and a second electro-optical unit, wherein the at least one image projection unit is operable to project a first set of images and a second set of images corresponding to the image onto the first electro-optical unit and the second electro-optical unit respectively to provide a stereoscopic effect.

14. A volumetric display arrangement according to claim 1 being implemented as one of an augmented reality device, a mixed reality device, a virtual reality device, a heads-up display and a table-top display device.

15. A method for representing content of an image at different focal distances in a view of real-world environment for eyes of a viewer using at least one electro-optical unit comprising two or more optical diffuser elements arranged parallel to each other, the method comprising:

projecting multiple depth planes of the image;

displaying, independently, one of the projected multiple depth planes of the image at one of the two or more optical diffuser elements at a given instant of time; and using a waveguide with an in-coupling element positioned with respect to the at least one electro-optical unit to guide light associated with the multiple depth planes on the waveguide to combine the view of real-world environment with the independently displayed multiple depth planes of the image via total internal reflection.

* * * * *